US007051568B2

(12) United States Patent
Ciotti

(10) Patent No.: US 7,051,568 B2
(45) Date of Patent: May 30, 2006

(54) MULTI-PURPOSE HYDRAULIC TOOL

(75) Inventor: Armand Ciotti, Churchville, PA (US)

(73) Assignee: Southampton Manufacturing, Inc., Feasterville, PA (US)

( * ) Notice: Subject to any disclaimer, the term of this patent is extended or adjusted under 35 U.S.C. 154(b) by 253 days.

(21) Appl. No.: 10/664,284

(22) Filed: Sep. 17, 2003

(65) Prior Publication Data

US 2005/0056078 A1 Mar. 17, 2005

(51) Int. Cl.
*F16K 11/07* (2006.01)
*F15B 15/22* (2006.01)

(52) U.S. Cl. .................. 72/453.01; 137/270; 173/138; 173/206; 91/428

(58) Field of Classification Search ............ 72/453.01; 91/399, 428; 137/270; 173/206
See application file for complete search history.

(56) References Cited

U.S. PATENT DOCUMENTS

| | | | | |
|---|---|---|---|---|
| 3,882,883 | A | 5/1975 | Droegemueller | |
| 4,366,673 | A | 1/1983 | Lapp | |
| 4,548,229 | A * | 10/1985 | Johnson | 137/270 |
| 5,442,992 | A | 8/1995 | Sanner et al. | |
| 5,778,755 | A | 7/1998 | Boese | |
| 6,490,962 | B1 | 12/2002 | Schultz | |
| 6,679,340 | B1 * | 1/2004 | Tatai | 173/138 |

* cited by examiner

*Primary Examiner*—David Jones
(74) *Attorney, Agent, or Firm*—Frank J. Benasutti

(57) ABSTRACT

A multi-purpose hydraulic tool of the open center and closed center type is provided with an OC/CC knob mounted on the trigger activated spool. The spool has a knob which can be turned to easily move between OC and CC operating conditions, without the use of additional tools. A check spool assembly works in conjunction with spool assembly in the open-center condition to provide for release of oil at the end of the return stroke.

Adapters are provided so that crimping heads can be easily interchanged.

3 Claims, 7 Drawing Sheets

MULTI-PURPOSE HYDRAULIC TOOL

BACKGROUND OF THE INVENTION

1. Technical Field

This invention relates to hydraulic hand tools, and more particularly, to a hydraulic tool that can use a constant pressure fluid delivery system or a constant volume fluid delivery system. In particular, this invention relates to a hydraulic tool having a selector switch to operate the tool in an "open center" (OC) mode or a "closed center" (CC) mode.

2. Description of the Prior Art

Hand held hydraulic tools capable of operating by two different modes of operation known as constant volume and constant pressure are disclosed in the prior art such as U.S. Pat. No. 4,366,673, issued Jan. 4, 1983 to Lapp. That patent shows an apparatus having a valve body with a pressure port 25 and a return port 26, a cross port 31 and a tubular conduit 72, a valve spool 45, and a selector member 63 in which the plug 63 enables the valve 45 to be converted so that the amplifier 13 may be used with either an open center or a closed center pump system (see column 4, line 54).

A closed-open center hydraulic valve assembly is shown in U.S. Pat. No. 3,882,883, issued May 13, 1975 to Droege-mueller.

The term "constant volume" refers to the fact that there is an open center spool valve. In such an arrangement, oil flows back to the source through the spool in what is known as the neutral or off position.

In a constant pressure tool, a closed center spool prevents the oil from flowing back, thereby maintaining the pressure.

U.S. Pat. No. 5,442,992, issued Aug. 22, 1995 to Sanner, et al., discloses a hydraulic tool which has a rotatable selector 60, FIG. 1. In the constant volume (OC) mode, fluid flows on the back side of the piston and around the piston through a passage 62 having a check valve therein permitting fluid flow in only one direction from a cross-port 52 to the opposite end of the tubular conduit.

U.S. Pat. No. 6,490,962, issued Dec. 10, 2002 to Schultz, discloses a hydraulic tool in which a selector sleeve 5 may be moved so that oil can pass through a hole 12 in the tube 6 which is coincident with a hole 9a in a sleeve valve 9 in the constant volume (OC) mode neutral position, as shown in FIG. 3. In order to move this sleeve, it is necessary in practice to back off a set screw (shown in the Figure but not identified in the description of the patent specification), so that two portions butt up against one another and the spring 13 is compressed. This selector sleeve provides for switching between the OC and CC modes.

This patent shows, discloses and claims a hydraulic tool adjustable between two modes of operation. One mode is known as the open center mode, or constant volume mode; and the other mode is known as a closed center mode, or constant pressure mode. Each mode has both a neutral position and a work position.

The constant pressure neutral position is shown in FIG. 1 wherein pressurized fluid travels through a tube into a retract chamber.

When the trigger 20 is squeezed, the configuration is as in FIG. 2. This is the working position when the hydraulic fluid flows into a drive chamber 4 causing the piston 2 to move to the left, and exhausting fluid which was in the retract chamber 3 to exhaust through the central tube out an exit port 15.

In the constant volume mode, the neutral position is shown in FIG. 3 wherein fluid passes through a central tube 6 and into the retract chamber 3. At the same time, the excess fluid exits through a small hole 12 between the ends of the tube 6 and then out through the exit port before ever reaching the drive chamber 4.

When the trigger is pulled, the working position is as shown in FIG. 4 which is identical to the working position in FIG. 2, that is, the fluid passes directly into the drive chamber. In this mode, fluid exits just as it did in FIG. 2 down the inner tube and out the exit port 15 from the retract chamber.

U.S. Pat. No. 5,778,755, issued Jul. 14, 1998 to Boese, also discloses a hand-held and operated hydraulic tool with a control valve having a sensor switchable between an open end and closed condition. The adjustment assembly provides a structure which can be configured to force open shuttle spool valves in the control apparatus in a neutral condition for use with a constant volume power supply. The adjustment assembly can also be configured to be disengaged from the shuttle spool valves in a neutral condition for use on a constant pressure hydraulic power system.

DISCLOSURE OF THE INVENTION

Summary of the Invention

I have invented a multi-purpose hydraulic tool of the open center and closed center type having a trigger actuated spool means having a trigger and a spool, and a knob mounted on the spool to rotate the spool between open center and closed center conditions.

The knob has easily recognizable indicia to apprise field personnel of the operating conditions, that is, the open-center (OC) and closed-center (CC) conditions. The knob may be rotated to "O" (OC) or "C" (CC) by hand without any additional tools.

The tool has a ram and an adapter means for operative engagement with the ram. The adapter means provides a means for mounting a prior art crimping tool, such as a die. A number of different adapter means are provided to accommodate various prior art tools.

DESCRIPTION OF THE PREFERRED EMBODIMENTS

Figure 1:
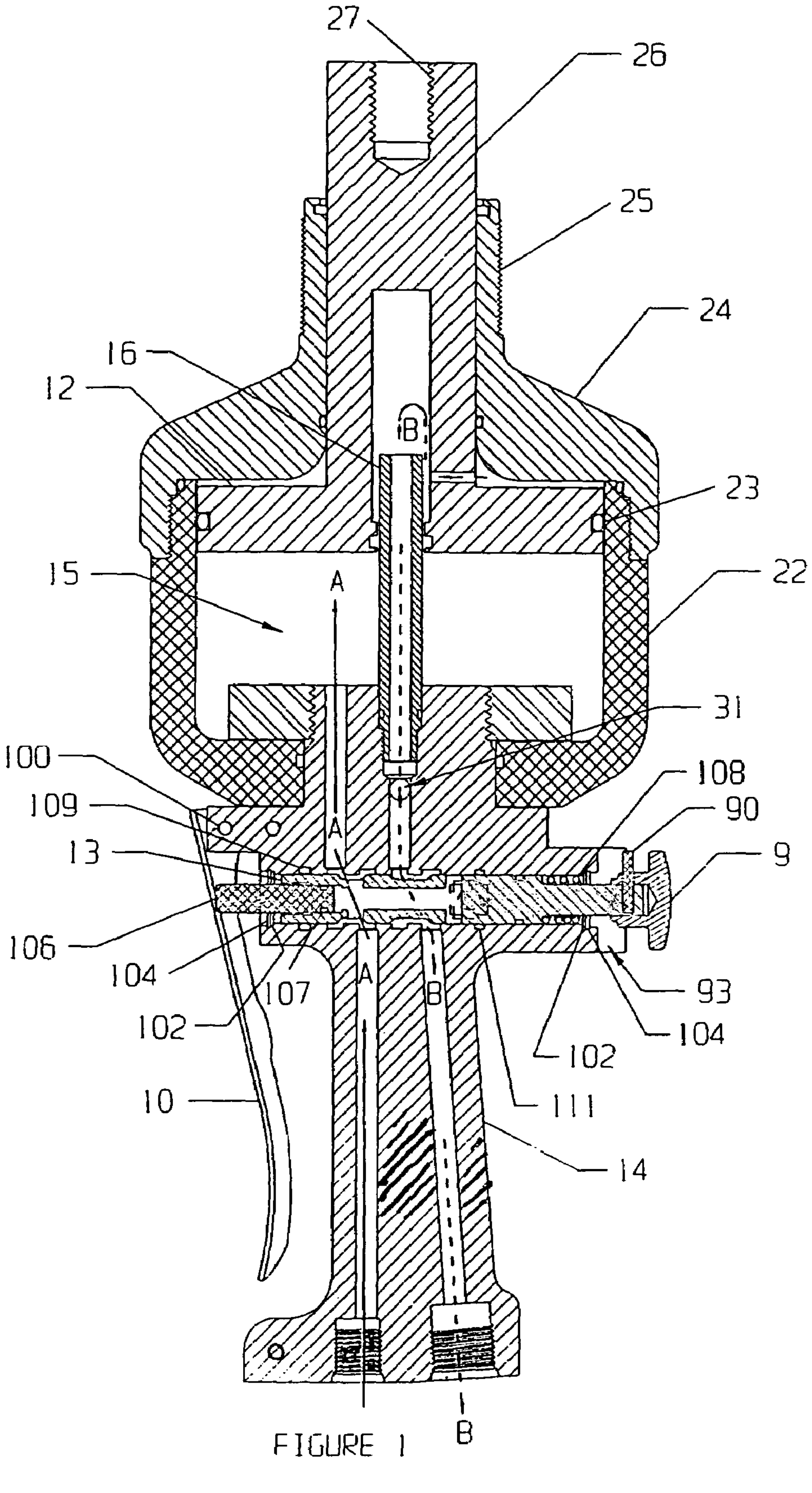
FIG. 1 is a longitudinal sectional view of a tool in accordance with my invention.

Referring to the Figures, FIG. 1 shows a section of a hydraulic tool in accordance with the preferred embodiment of my invention. The tool has a handle body 14 to which a trigger 10 is pivotally mounted at 100. A spool 13, configured for open center and closed center conditions of operation, is mounted transversely in the handle body. The spool is retained in the handle body by snap rings and washers 102, 104 at both ends. At one end, a portion 106 of the spool extends from the handle body to engage the trigger 10. This portion may be made as a separate part which is screwed into the other part of the spool. An "O" ring seal is provided at 107. At the other end of the spool, a spring 108 engages a shoulder on the spool and is compressed to exert a force on the spool and maintain it in engagement with the handle. In FIG. 1, the trigger 10 is shown depressed inwardly toward the handle, so as to fully compress the spring 108. "O" ring seals are provided at 109 and 111 between the spool and the handle body. The piston 12 is shown in FIG. 1 near its fully advanced position.

Figure 2:
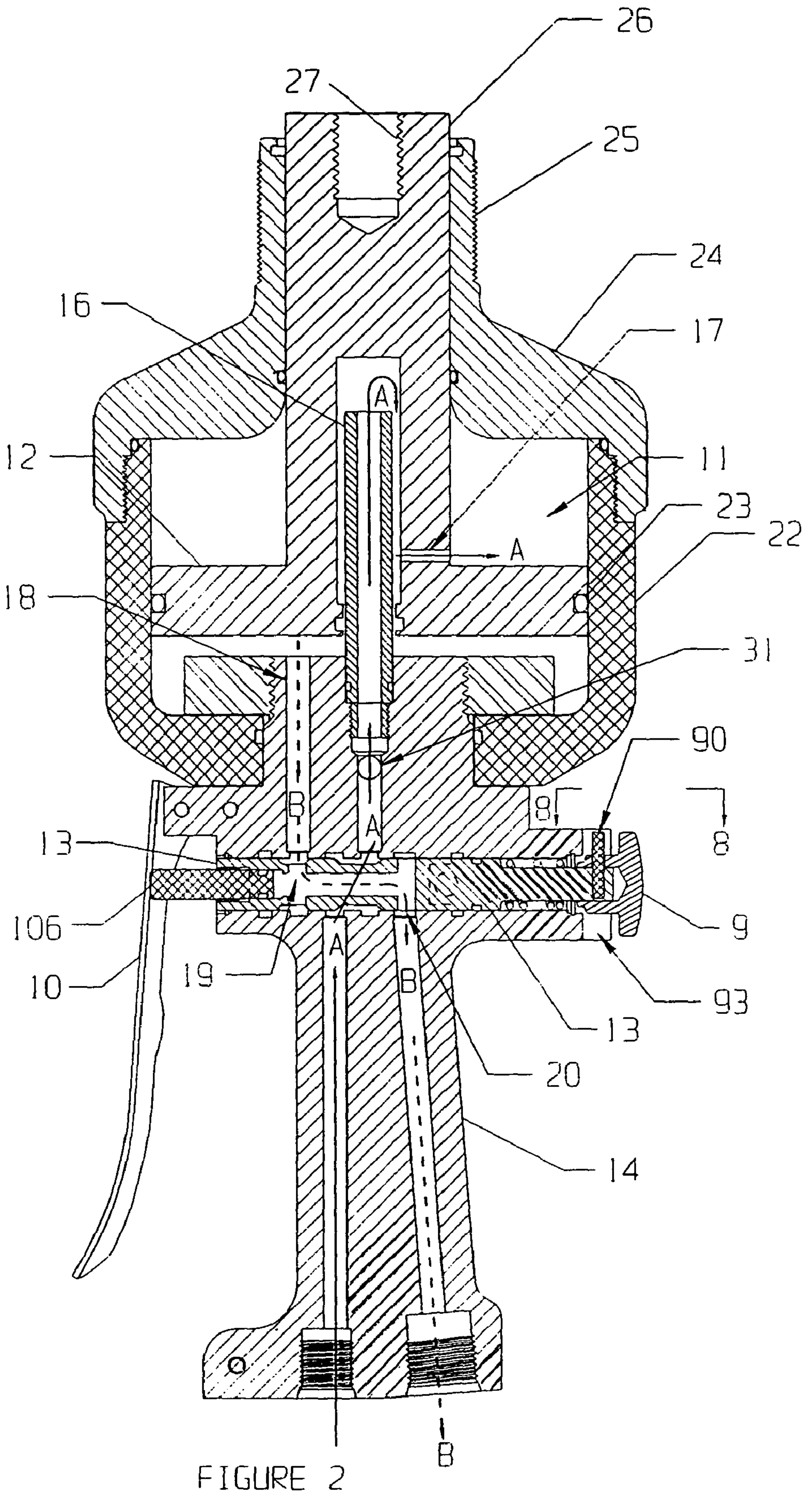
FIG. 2 is a longitudinal sectional view of a tool in accordance with my invention shown in an alternate position.

FIG. 2 shows the handle 10 released. The spring 108 is expanded pushing against the spool and forcing end 106 to exert a force against the handle to fully release the trigger. The piston 12 is near the retracted position.

In both views the solid dark arrows "A" show the path of the pressurized oil driving the ram 26—forward in view 1, backward in view 2. The dotted dark arrows "B" show the path of the oil returning to the source (not shown; but well known in the art) from the opposite side of the piston 12.

When the trigger is depressed oil is directed over the spool 13 to the cylinder area 15 directly behind the piston 12. The oil in front of the piston is forced out through a non-moving center tube 16 running through the center of the piston—similar to most common double acting piston assemblies of this type.

When the trigger is released (FIG. 2) the pressurized oil is then directed through the center tube 16 and enters the cylinder area 11 above the piston through a hole 17 in the side of the piston; and generates force in the return direction. The oil behind the piston evacuates the cylinder area through the hole 18 leading to the trigger spool. The exiting oil then enters a hole 19 in the side of the spool 13, passes through the center of the spool 13, and exits directly above the open return port 20.

The operating condition shown in FIGS. 1 and 2 is known as constant volume and the spool is shown in the open center condition. In that position in FIG. 2, oil is permitted to circulate through the tool.

Referring to FIGS. 1 and 2, the cylinder 22 housing the piston is preferably made of aluminum. An "O" ring 23 is disposed around the periphery of the piston to provide a seal with the inner wall of the cylinder. A nosepiece 24 is threaded onto the end of the cylinder. As pressure builds in the cylinder, it expands, thereby tightening, that is, enhancing the strength of the threaded engagement with the nosepiece.

The nose piece has an externally threaded end 25 to accept different configurations of tool heads (not shown, but well known in the art).

The piston has a ram 26; either threaded onto it or as part of a unitary assembly, as shown in the figures. The ram has internal threads 27 to accept adapters for the required parts for the different heads (aforesaid). These adapters are shown in greater detail in FIGS. 9 and 10; and comprise configurations for known prior art cradles for holding crimping tools and dies. I have designed these adapters 54 and 63 with threaded bosses 53 for engagement with the threads 27 of the ram.

Figure 9:
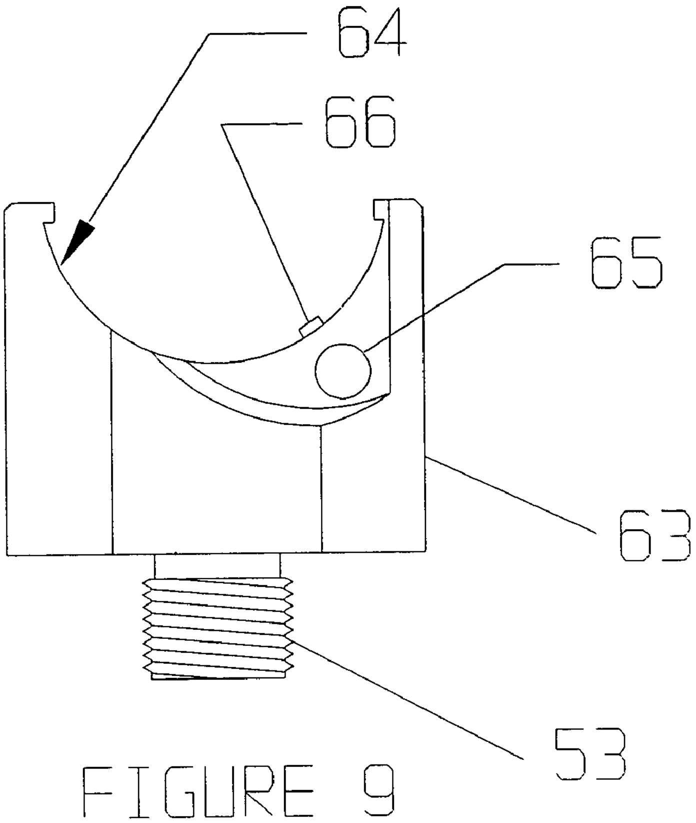
FIG. 9 is a perspective view of a portion of a device in accordance with my invention.
Figure 10:
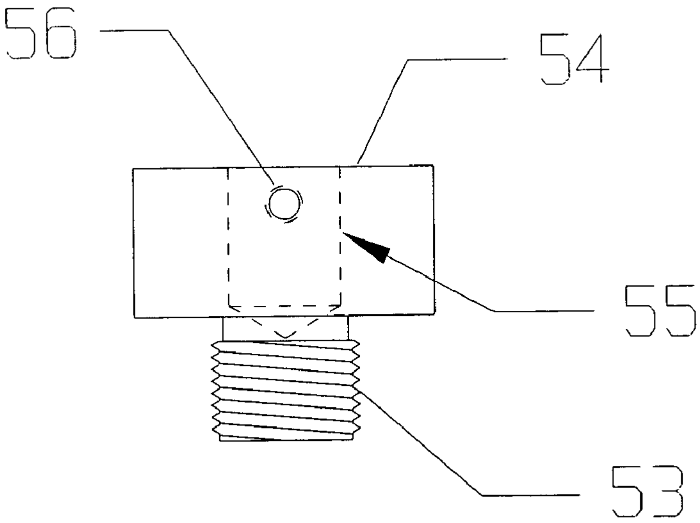
FIG. 10 is a perspective view of a portion of a device in accordance with my invention.

FIG. 9 shows an adapter 63 for a prior art U-die. The cylindrical adapter 63 has a cradle 64 for the U-die; which die (not shown) is held in place by a spring loaded button 65 and pin 66 arrangement (not shown in detail; but well known in the art).

The cylindrical adapter 54 has a bore 55 for a prior art tool, such as, a Kearney die; which die (not shown) is held in place by a set screw 56 (not shown in detail; but well known in the art).

The interchangeability of crimping heads and dies is unique in the industry.

If a crimping tool is used, a crimp would be made on full extension of the piston and ram 26. Then the operator would let go of the trigger 10. The spring would then drive the spool to the left when viewed in FIG. 1 to the position shown in FIG. 2. While the tool is working, one does not want constant volume conditions until the piston returns completely.

Figure 3:
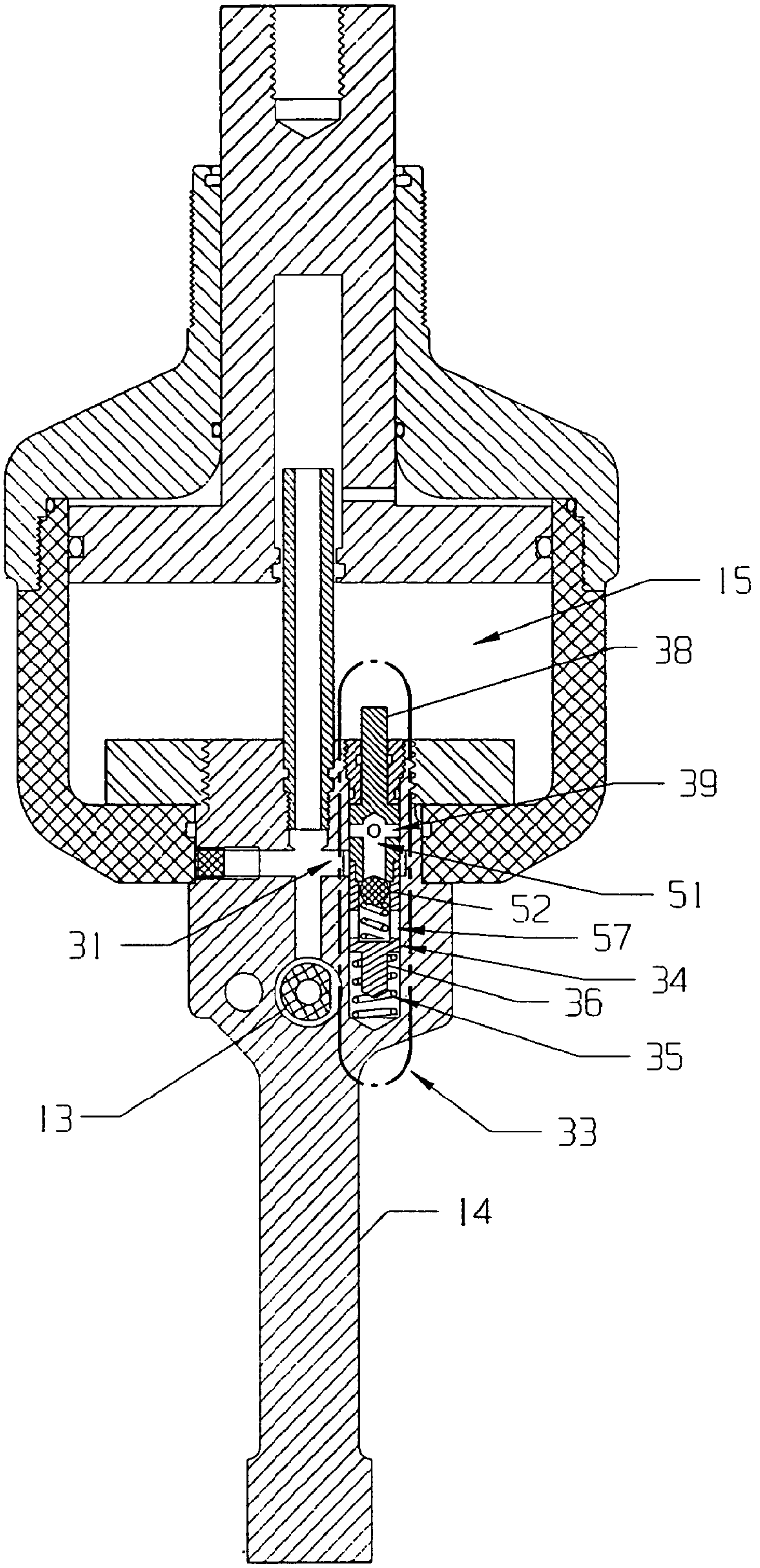
FIG. 3 is a rear sectional view of a tool in accordance with my invention.
Figure 4:
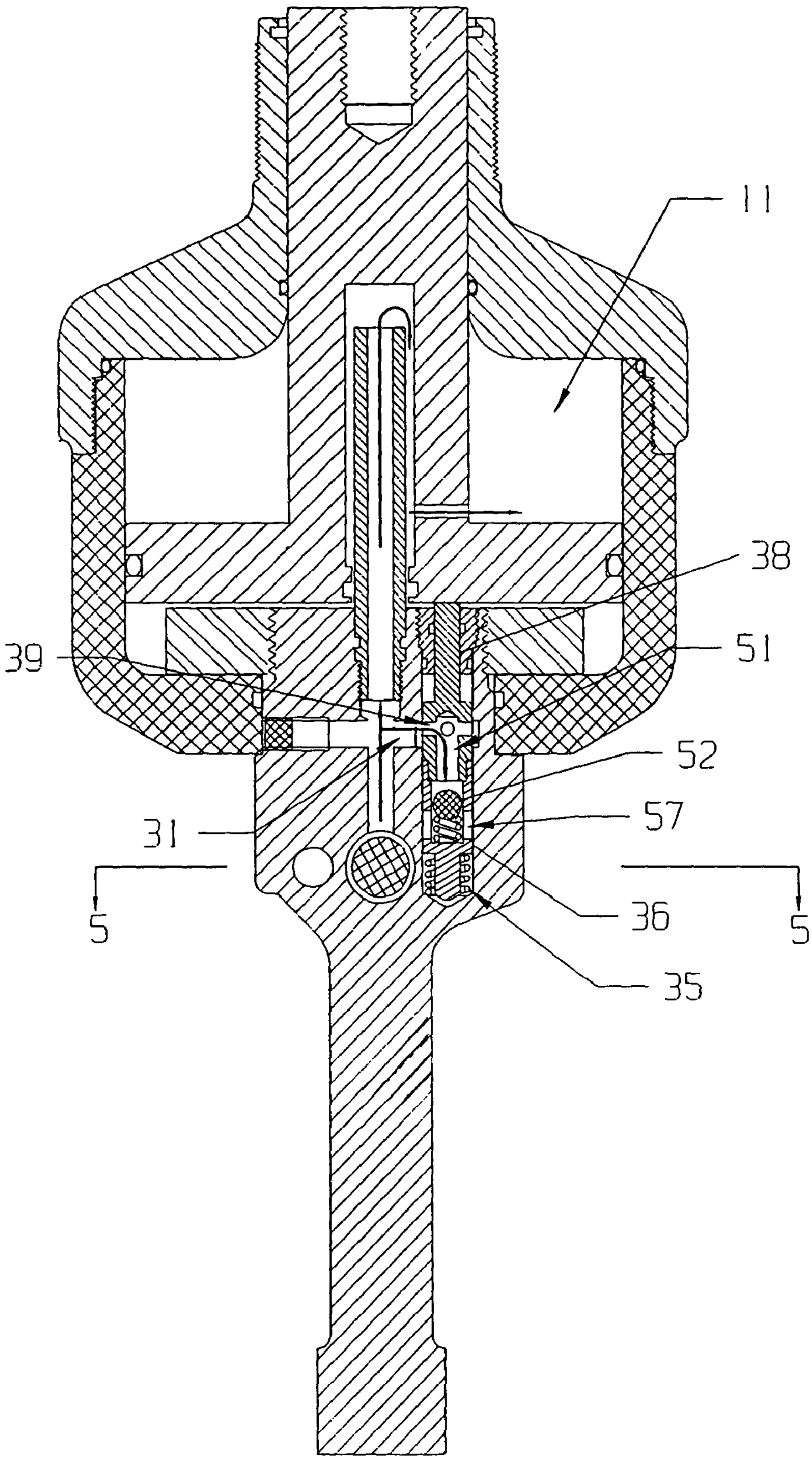
FIG. 4 is a rear sectional view of a device in accordance with my invention shown in an alternate position.

Referring to FIGS. 3 and 4 a check spool assembly means 33 is shown in section. This assembly means controls the flow of oil through the tool. It is mounted in the handle body 14. It comprises a spring loaded plunger means 37 and a check valve means 34. The force of the spring 35 on the check valve base 36, forces the plunger 38 to extend into the cylinder area 15 when the piston is in the extended position. As the piston 12 is retracted, it engages the end of the plunger 38 and forces the plunger back into its housing in the handle body 14.

A by-pass passageway 31 is located below the center tube 16. This passageway leads to the two-stage check spool assembly means 33, FIG. 3. The check spool assembly means 33 is not visible in FIG. 1 or 2 as it is directly behind the center tube. The check spool assemble means further comprises a plunger means 37 with two cross holes 39 and passage 51 for fluid flow communication with the passageway 31. When the plunger means 37 is pushed in sufficiently, oil then flows into the passageway 51 and forces the ball 52 off of its seat and thus opens the check valve (see FIG. 4). Slots 57 in the base 36 allow oil to escape from the check spool assembly means and continue into passageway 61, FIG. 5.

In operation, when the piston 12 is in the advanced position, the check valve means 34 prevents oil from entering the passageway 51. When the trigger is released, the oil in passageway 31 is prevented from entering the passageway 51 because the cross holes of the passageway 51 are not lined up with the passageway 31.

Figure 5:
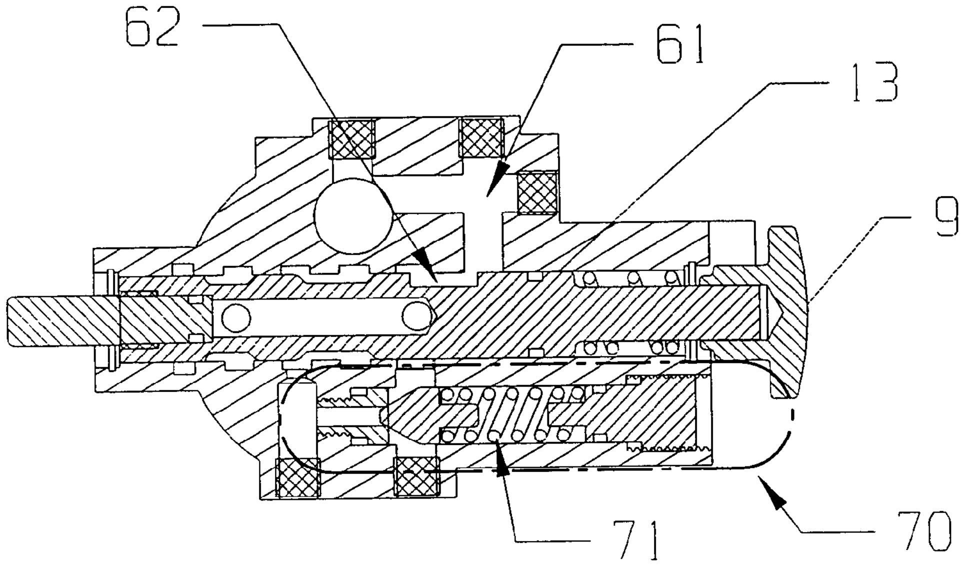
FIG. 5 is an enlarged sectional view taken along the lines and arrows 5—5 in FIG. 4, of a portion of a device in accordance with my invention.

When the piston 12 is fully retracted, oil is permitted to flow through the check valve means and into passageway 61, FIG. 5. With the spool 13 set to the open-center position, oil flows through the passageway 61 and around a notch 62 in the spool 13 and into a chamber 20 which communicates with the outlet port of the tool. Therefore, right at the end of the travel it releases all of the oil.

If the source of the oil under pressure is constant volume, then the tool is set to OC.

When the correct conditions exist, oil will be allowed to circulate through the tool to satisfy the open-center pump condition while simultaneously maintaining pressure on the piston in the reverse direction. The conditions are:

1. The OC/CC knob must be turned to the "O" (OC) position;

2. The trigger must be released; and

3. The piston must be fully retracted, depressing the check spool assembly means.

When these conditions exist, as shown in FIG. 4, the oil flow will stop in the center tube 16, but will continue to circulate through the handle body 14.

In FIG. 3 the piston is advanced and no oil may flow through the check spool assembly.

FIG. 4 shows the piston retracted and depressing the check spool assembly means allowing oil to flow from bypass hole 31, into the check spool assembly means through port 51, pushing open check ball 52, and return to the spool chamber via passageway 61. The check ball assembly means prevents oil from flowing in the wrong direction when the trigger is depressed and the piston is still in the retracted position. The ball 52 also generates upward pressure on the assembly forcing it into the correct position as the piston advances when the trigger is depressed.

A pressure regulator 70 is provided mounted in a hole 71 in the handle body 14 and in fluid flow communication with the inlet and outlet to regulate the oil pressure in the tool; in a manner well known in the art.

Figure 7:
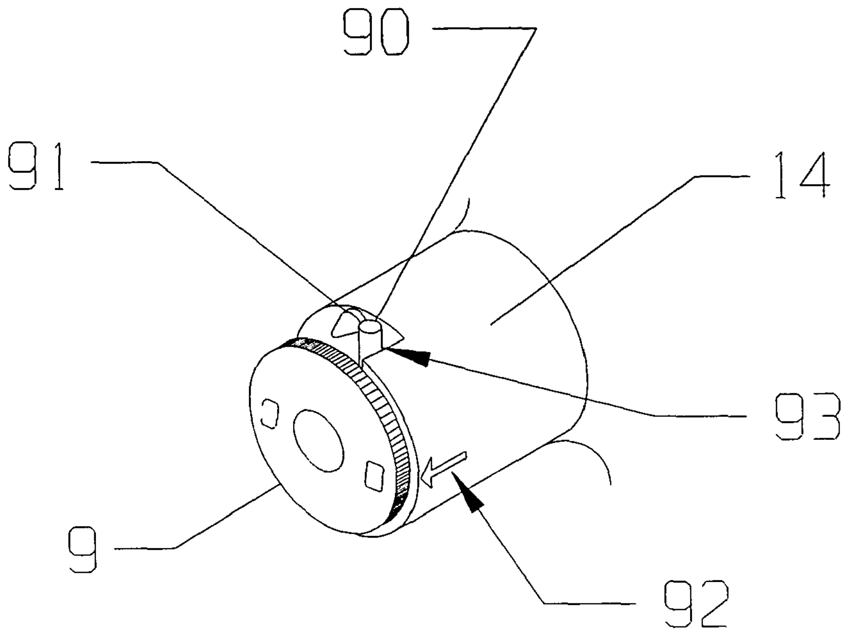
FIG. 7 is a perspective view of a portion of a device in accordance with my invention.
Figure 8:
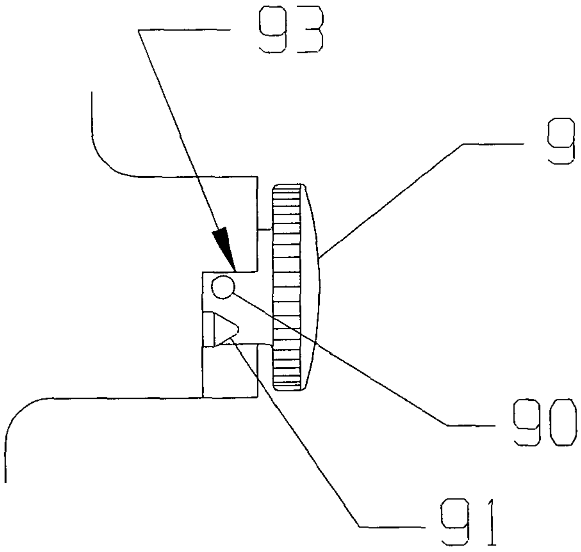
FIG. 8 is a view taken as indicated by the lines and arrows 8—8 in FIG. 2 of a portion of a device in accordance with my invention.

Referring to FIGS. 2, 7 and 8, the knob assembly is shown in greater detail. The knob 9 is mounted to the spool 13 by a roll pin 90. The handle assembly body 14 has a step 93 that extends for more than 180 degrees. The roll pin 90 is restrained by the step 93 and the head of a mushroom shaped pin 91 mounted in the handle assembly body 14. This prevents the spool 13 from rotating by itself. To turn the knob 9, the operator of the device must depress the trigger 10 all the way; in which event the roll pin 90 will be positioned to clear the head of the mushroom pin 91 upon rotation of the knob 9. The knob can then be rotated 180 degrees from the "open center" position shown in FIG. 7, to the "closed center" position.

To provide the operator with an indication of the operating condition of the device, I have provided indicia in the surface of the parts, as follows. An arrow 92 is provided in the surface of the handle assembly body 14. An "O" indicating "open center" and a "C" indicating "closed center" are provided in the outer surface of the knob 9; for visual registration with the arrow 92 to indicate the condition of operation.

The knob is knurled around the circumference to aid gripping it while turning it.

Figure 6:
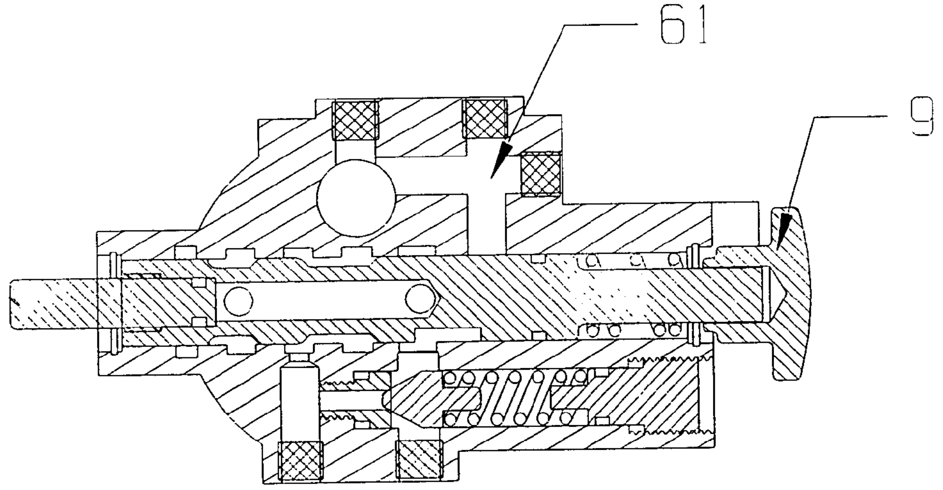
FIG. 6 is an enlarged sectional view similar to FIG. 5, of a portion of a device in accordance with my invention, shown in an alternate position.

In FIG. 6, the OC/CC knob 9 has been rotated to the closed-center position thereby rotating the spool. The spool obstructs passageway 61 and the oil is prevented from flowing through the check spool assembly means. The closed center condition is not used as frequently as the open center condition; but existing equipment may still require this mode of operation. In the closed center condition the check valve assembly means does not function as described above. The OC/CC knob mounted on the spool on this type of tool and being capable of changing the condition of operation without additional tools, is a feature totally unique in the industry.

What I claim is:

1. A multi-purpose hydraulic tool of the open center and closed center type having a trigger and a spool having an axis, said spool positioned to be moved axially in response to the movement of the trigger, and a knob mounted on the spool to rotate the spool about its axis between open center and closed center conditions of operation.

2. The tool of claim 1 further comprising a ram and an adapter means for operative engagement with said ram; said adapter means providing a means for mounting a crimping tool, such as a die.

3. The tool of claim 1 further comprising a check spool assembly means in fluid flow communication with the spool means for regulating the flow of oil through said tool in response to the position of the cheek spool assembly means.

* * * * *